(12) United States Patent
Xu et al.

(10) Patent No.: US 9,990,276 B2
(45) Date of Patent: Jun. 5, 2018

(54) READ-WRITE CONTROL METHOD FOR MEMORY, AND CORRESPONDING MEMORY AND SERVER

(71) Applicant: TENCENT TECHNOLOGY (SHENZHEN) COMPANY LIMITED, Shenzhen, Guangdong (CN)

(72) Inventors: Jianfeng Xu, Guangdong (CN); Yue Wu, Guangdong (CN); Chaoyu Zhong, Guangdong (CN); Ming Xie, Guangdong (CN); Wenzheng Li, Guangdong (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 358 days.

(21) Appl. No.: 14/463,071

(22) Filed: Aug. 19, 2014

(65) Prior Publication Data

US 2014/0359233 A1    Dec. 4, 2014

Related U.S. Application Data (63) Continuation of application No. PCT/CN2013/071385, filed on Feb. 5, 2013.

(30) Foreign Application Priority Data

Feb. 20, 2012 (CN) .......................... 2012 1 0038206

(51) Int. Cl.
*G06F 12/02* (2006.01)
*G06F 12/00* (2006.01)

(52) U.S. Cl.
CPC ............ *G06F 12/023* (2013.01); *G06F 12/00* (2013.01); *G06F 12/02* (2013.01);
(Continued)

(58) Field of Classification Search
None
See application file for complete search history.

(56) References Cited

U.S. PATENT DOCUMENTS

| 2007/0162707 A1 * | 7/2007 | So .......................... G06F 3/0613 711/154 |
| 2009/0254590 A1 * | 10/2009 | Shlomai ................. G06Q 10/10 |
| 2014/0208003 A1 * | 7/2014 | Cohen ................. G06F 12/0246 711/103 |

FOREIGN PATENT DOCUMENTS

| CN | 1632765 A | 6/2005 |
| CN | 1890645 | 1/2007 |

(Continued)

OTHER PUBLICATIONS

Office Action issued in corresponding Chinese Application No. 201210038206.4, dated Sep. 14, 2015.
(Continued)

*Primary Examiner* — Midys Rojas
(74) *Attorney, Agent, or Firm* — Haug Partners LLP; William S. Frommer (57) ABSTRACT

Described are a read-write control method for memory, and a corresponding memory and server. The method comprises: dividing a storage resource of the memory by taking a block as a unit; to write data, combining the data to be written into a data block, writing the data block in a free segment of the memory, and recording an identifier and a corresponding index of the data, the index of the written data is an offset indicating a memory location of the data in the memory; to read data, reading the data from the offset of the memory according to an identifier and a index of the data to be read. When read-write control is performed on the memory, the number of the times that the I/O operation is performed on (Continued)

the memory is reduced during data writing, thereby improving the efficiency of the write operation on the memory.

16 Claims, 10 Drawing Sheets

(52) U.S. Cl.
CPC ...... *G06F 12/0223* (2013.01); *G06F 12/0238* (2013.01); *G06F 12/0246* (2013.01)

(56) References Cited

FOREIGN PATENT DOCUMENTS

| CN | 1890645 | A | 1/2007 |
|---|---|---|---|
| CN | 101122887 | | 2/2008 |
| CN | 101122887 | A | 2/2008 |
| CN | 101493753 | | 7/2009 |
| CN | 101493753 | A | 7/2009 |
| CN | 101533408 | A | 9/2009 |
| CN | 101727295 | A | 6/2010 |

OTHER PUBLICATIONS

International Search Report issued in corresponding International Application No. PCT/CN2013/071385 dated May 16, 2013.

\* cited by examiner

| Page1 | Page2 | Page3 | Page4 | Page5 | Page6 |
|---|---|---|---|---|---|
| Data1 | Data2 | Data3 | Data4 | Data5 | Data6 | Data7 | 8 | Data9 |

FIG. 7

| Index information |||
|---|---|---|
| k1-page | k2-page | k3-page |
| k4-page | k5-page | k6-page |
| k7-page | k8-page | k9-page |

READ-WRITE CONTROL METHOD FOR MEMORY, AND CORRESPONDING MEMORY AND SERVER

CROSS-REFERENCE TO RELATED APPLICATIONS

This application is a U.S. continuation application under 35 U.S.C. § 111(a) claiming priority under 35 U.S.C. § § 120 and 365(c) to International Application No. PCT/CN2013/071385 filed on Feb. 5, 2013, which claims the priority benefit of Chinese Patent Application No. 201210038206.4 filed on Feb. 20, 2012, the contents of which are incorporated by reference herein in their entirety for all intended purposes.

TECHNICAL FIELD

The present disclosure relates to data storage technology, and specifically to a read-write control method for memory, and corresponding memory and server.

BACKGROUND

In current data storage technology, storage resource of a memory is usually divided by taking a block as a unit. That is to say, the memory is divided into many regions in a fixed size. Each region is a block. In current technology, the memory is usually divided into two kinds of blocks, one kind is basic block, and the other kind is overflow block. The basic block is configured to make a Hash calculating location for a convenience of data location. The overflow block is configured to store overflow data when the basic block is not enough.

In current technology, when data is stored in a memory, an offset indicating a memory location of the block in the memory is obtained by doing a Hash calculation to a key of the data firstly and then doing modulus operation. The data is written into a block in the offset indicating a memory location of the block in the memory. If there is data stored in the block in the offset indicating a memory location of the block in the memory, the data in the block in offset serve as old data. The old data are firstly read, then combined with new data, and written with the new data into the block again. If the block in the offset indicating a memory location of the block in the memory is full, the data left are written into an overflow block, and an address of the overflow block is stored at end of the block in the offset indicating a memory location of the block in the memory.

Shortcomings in the current technology are described in the following.

When the data is written, at least one input/output (I/O) operation to the memory is needed every time when writing data. Moreover, when the block to be written includes data, one more read operation is needed in order to combine the old data with the new data. Thus, more I/O operations are induced. From the above description, in current technology more I/O operation times of writing operation to the memory are needed. Thus an efficiency of writing operation to the memory is low. The current technology does not support the memory well, especially to the memory such as solid state disk (SSD) of which life and property are limited to an erasure times and random writing. When data is written, frequent I/O operation may not only lead to low efficiency of writing operation to the SSD but also seriously reduce the life of the SSD.

SUMMARY

A read-write control method for memory, and corresponding memory and server are provided in embodiments of present disclosure. The method, the memory and the server can realize read and write control to the memory, and at the same time, can reduce input/output (I/O) times of the storage when the data is written, and improve the efficiency of the writing operation to the memory.

The embodiments may be realized as the follows.

A read-write control method for memory includes:
 dividing a storage resource of the memory by taking a block as a unit;
  to write data, combining the data to be written into a data block, writing the data block in a free segment of the memory, and recording an identifier and a corresponding index of the data, the index information of the data is an offset indicating a memory location of the data in the memory;
  to read data, reading the data from the offset indicating a memory location of the data in the memory according to an identifier and an index of the data to be read.

A memory, storage resource of the memory is divided by taking a block as a unit, the memory includes:
 a write control module, configured to combine data to be written into a data block, write the data block in a free segment of the memory, and record an identifier and a corresponding index of the data, the index of the data being an offset indicating a memory location of the data in the memory;
 a read control module, configured to read the data from the offset indicating a memory location of the data in the memory according to an identifier and an index of the data to be read.

A server includes at least one memory described above. When the number of the memory is more than two, the step of writing the data block in a free segment of the memory including: searching from the first block of the first memory to the first block of the last memory orderly, if no free segment being found, searching the next block of each memory orderly until a free segment being found, then writing the data block into the free segment.

In the embodiments of present disclosure, when writing the data, firstly combining the more than one item of data into a data block, writing the data block into the free segment of the memory, and recording the identifier and a corresponding index. Thus, in the embodiments of present disclosure, read and write control for the memory can be realized. Comparing with the typical technology, there is no need to do an input/output (I/O) operation to each data when writing the data in the embodiment of present disclosure. The several items of data are combined and written into the memory at a same time by doing only one I/O operation. The I/O operation times of the memory is reduced when writing the data and the efficiency of writing operation to the memory is improved.

The I/O operation times to the memory may be measured by input/output operation per second (I/OPS). The embodiment of present disclosure can reduce the I/OPS when writing the data and improve the efficiency of writing operation to the memory.

The embodiments of present disclosure are implicated to SSD which property and the life time is limited to the erasure times. The writing operation efficiency of the SSD is improved and the life of the SSD is extended because the I/O operation is greatly reduced when writing the data.

DETAILED DESCRIPTION OF ILLUSTRATED EMBODIMENTS

Further description of present disclosure will be illustrated clearly and completely, which is combined with embodiments in drawings and detailed embodiments.

Figure 1:
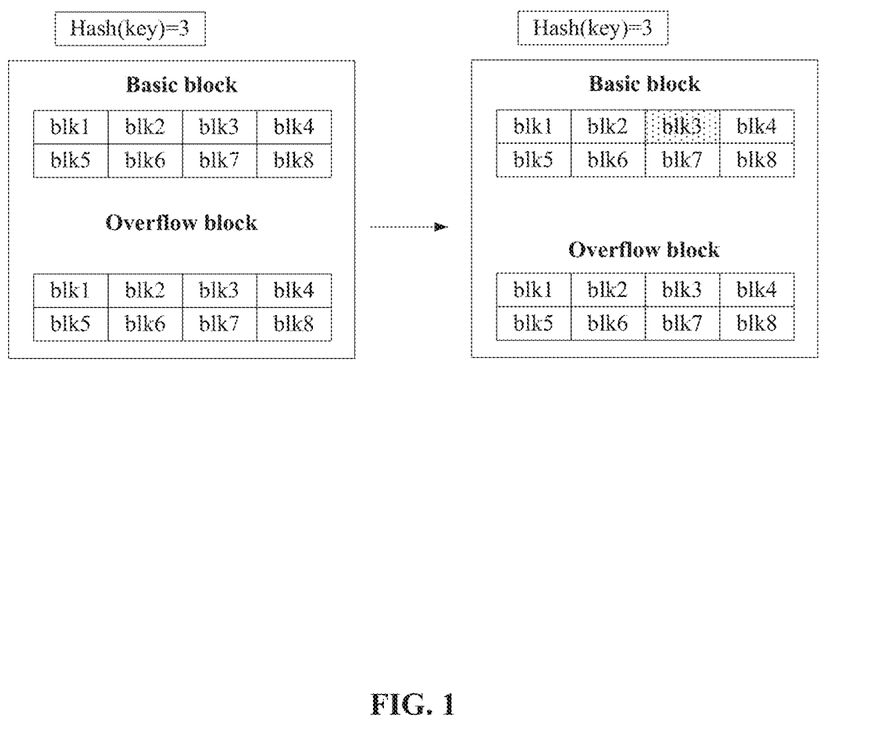
FIG. 1 is a schematic diagram of a read-write control method for memory in typical technology.

Referring to FIG. 1, FIG. 1 is a schematic diagram of a read-write control method for memory in typical technology. As shown in FIG. 1, if a value corresponding to a key of the data equals to three by doing the following process. The process is that firstly doing the Hash calculation to the key of the data, and then doing modulus operation. The data is stored into a third block of the basic blocks of the memory without any index. When the data is read, a same location process is needed. That is, a value corresponding to a key equals to three by doing the following process. The process is that firstly doing the Hash calculation to the key of the data, and then doing modulus operation. The data corresponding to the key is obtained by doing the following process. Firstly, the data stored in the third block of the basic blocks of the memory is read, and then decoded. If there is data stored in the third block of the basic block, the data stored serves as old data. When the data corresponding to the key is written, the old data is firstly read, new data and the old data is packed (encoded), then the new data and the old data packed is written into the third block of the basic block.

Figure 2:
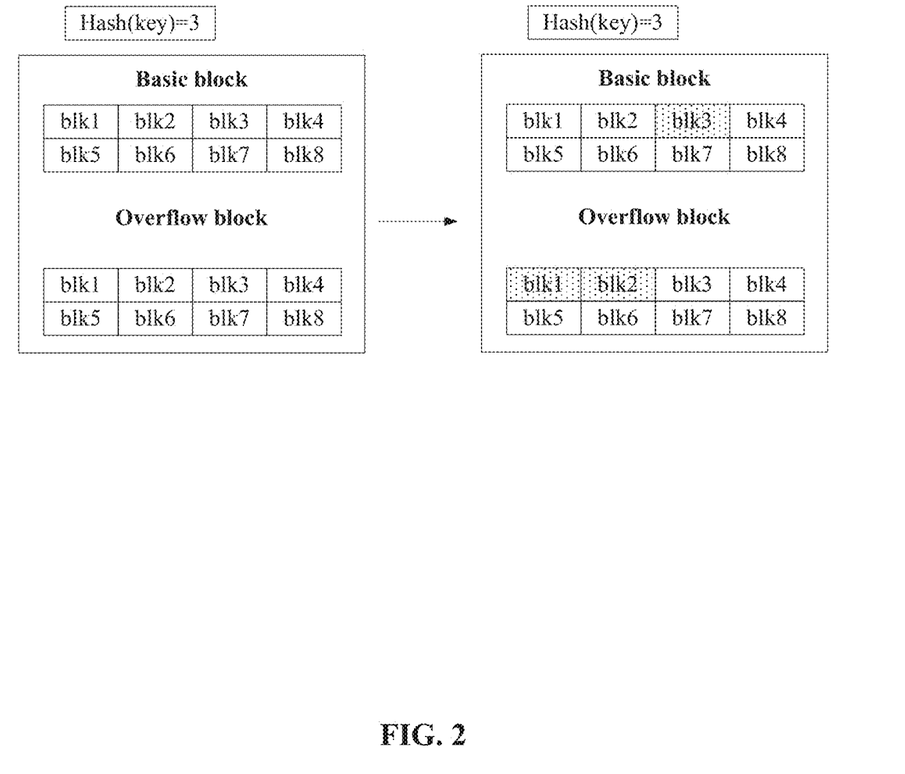
FIG. 2 is a schematic diagram of using an overflow block in the read-write control method for memory in typical technology.

Referring to FIG. 2, FIG. 2 is a schematic diagram of using an overflow block in the read-write control method for memory in typical technology. When data is written into the third block of the basic blocks of the memory, the third block of the basic blocks is written fully, but all of the data are not written into the third block. An free overflow block is found, the data left is written in the free overflow block, and an address of the overflow block is stored at the end of the third block of the basic blocks. When the data is read, firstly reading the data of the third block of the basic blocks, and then determining whether the data is complete. If the data read is incomplete, reading the left data in the overflow block according to the address of the overflow block stored at the end of the block in offset.

Figure 3:
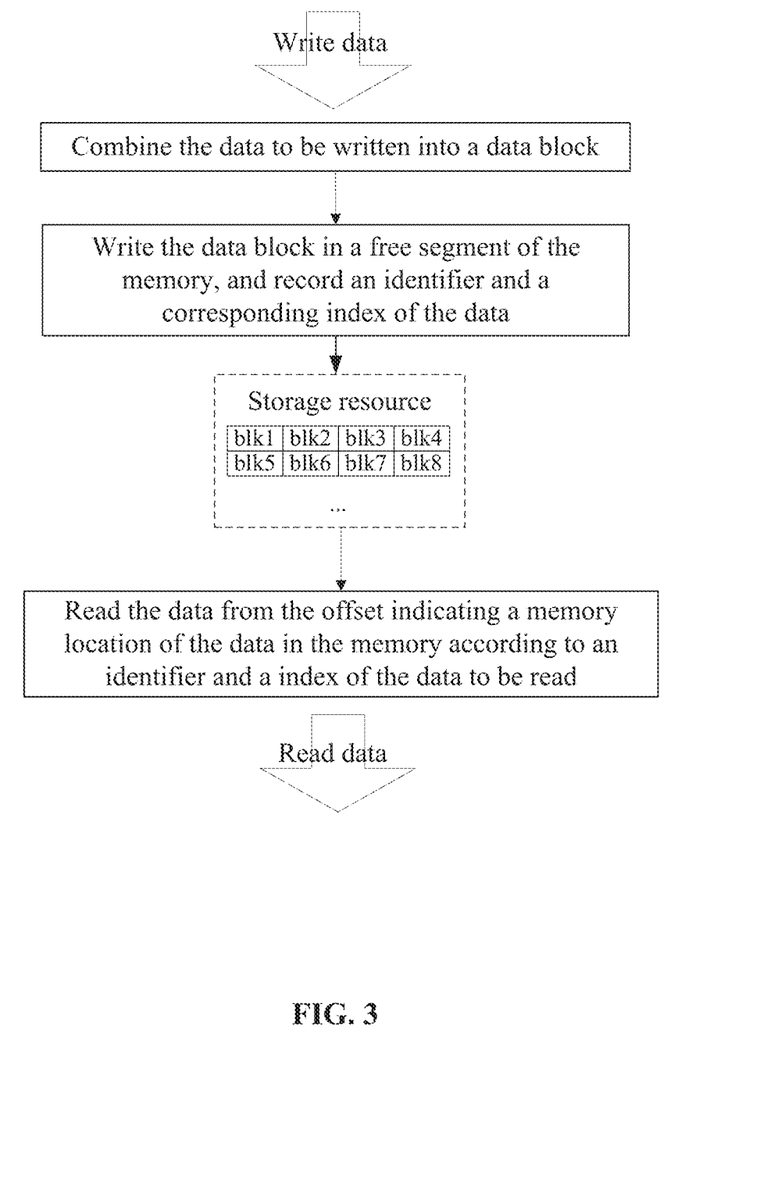
FIG. 3 is a schematic diagram of a read-write control method for memory according to one embodiment of present disclosure.

Referring to FIG. 3, FIG. 3 is a schematic diagram of a read-write control method for memory according to one embodiment of present disclosure. As shown in FIG. 3, in the read-write control method in the embodiment of present disclosure, dividing storage source of the memory by taking a block as a unit in order to index the data conveniently. As shown in FIG. 3, the block is marked as blk. To write data, combining the data to be written into a data block, writing the data block in a free segment of the memory, and recording an identifier and a corresponding index of the written data. The index of the data is an offset indicating a memory location of the data in the memory. To read data, reading the data from the offset indicating a memory location of the data in the memory according to an identifier and a index of the data to be read.

The identifier of the data is usually a key of the data. In other word, the identifier of the data is unique identifying information of the data in the memory. For example, if the identifier of the data is a message post at some time by somebody, when searching the message, the index (offset) of the data in the memory can be found according to the identifier, then the message can be found according to the index.

Figure 4:
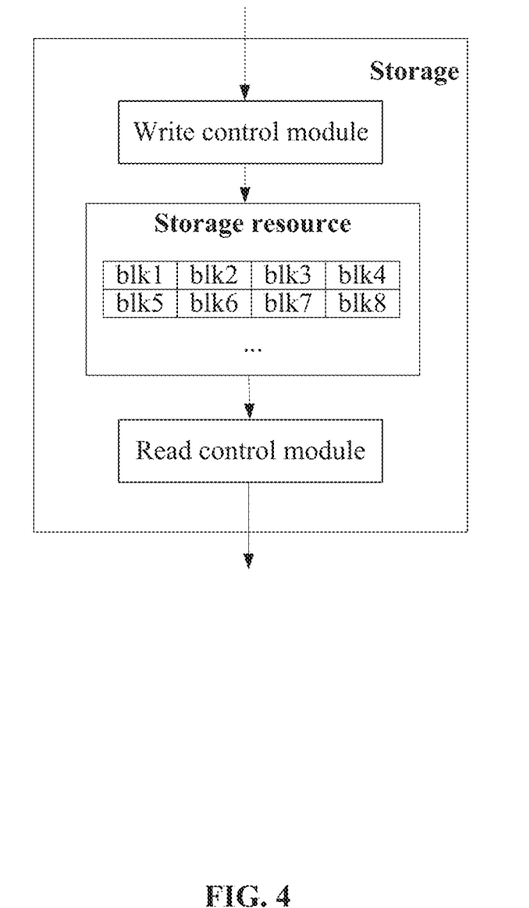
FIG. 4 is a schematic diagram of the memory according to one embodiment of present disclosure.

Referring to FIG. 4, FIG. 4 is a schematic diagram of the memory according to one embodiment of present disclosure. The memory can implement the read-write control method for the memory. As shown in FIG. 4, the storage resource of the memory is divided by taking a block as a unit. The memory includes a write control module and a read control module.

The write control module is configured to combine the data to be written into a data block, write the data block in a free segment of the memory, and record an identifier data and a corresponding index of the data. The index of the data is an offset indicating a memory location of the data in the memory.

The read control module is configured to read the data from the offset according to an identifier and a index of the data to be read.

In the method and the memory in the embodiments of present disclosure, the index of the data can be an offset indicating memory location of the data block combined with data in the memory. For example, the offset may be the nth block of all the blocks. When reading the data, searching the offset indicating a memory location of the data block combined with data in the memory from the index according to the identifier of the data, reading a whole content of the block from the offset, and reading the data from the whole content of the block according to the identifier of the data.

The method of present disclosure further includes figuring out the offset indicating a block location of the data in the data block combined when writing the data. The index of the data can include an offset indicating a memory location of the data block combined with data in the memory and an offset indicating a block location of the data in the data block combined with data. When reading the data, figuring out an absolute offset indicating a memory location of the data block combined with the data in the memory according to identifier of the data and an offset indicating a block location of the data in the block. Then, reading the data according to the absolute offset. In another word, reading the data according to the offset indicating a block location of the data in the data block combined with data. By doing this, when reading data, there is not need to read all data of the block, and only the data to be read is needed to be read.

The block of the memory can be divided by taking a page as a unit in the method and the memory in the embodiments of present disclosure. A size of the page is smaller than a size of the block. Moreover, when writing data, the write control module further divides the data block by taking a page as a unit when combining the data to be written into the data block. The size of the block and the size of the data block are integral multiple of a size of the page.

When writing data, recording an offset indicating a page location of the data in the page in the data page combined with data. The index of the data can be an offset indicating a memory location of the data page combined with data in the memory. In one embodiment, the offset indicating a memory location of the data page combined with data in the memory can be directly represented by the absolute offset indicating a memory location of the data page combined with data in the memory. That is a page number of the page in the storage is unique. In another word, the page from the first page of the first block to the last page of the last block has a unique page number. In another embodiment, the offset indicating a memory location of the data page combined with data in the memory can be represented by both of the offset indicating a block location of the data block combined with data in the memory and a relative offset indicating a block location of the data page combined with data in the data block combined with data.

When reading the data, the method is described in detail as the follows. Reading the content of the data page combined with data from the memory according to the identifier of the data and the index of the data. Reading the offset indicating a page location of the data in the page from the page, and reading the data of the page according to the offset indicating a page location of the data in the page. In another embodiment, directly reading the content of the data page combined with data according to the absolute offset indicating a memory location of the data page combined with data in the memory. In yet another embodiment, reading the content of the data page combined with data according to both of the offset indicating a memory location of the data block combined with data in the memory and the relative offset indicating a block location of the data page combined with data in the data block combined with data.

In one detailed embodiment, each block divided of the memory has the same size, and the data block combined has the same size with the block divided of the memory. By doing this, the processing operation can be simplified.

In the embodiment of present disclosure, the block is divided by taking a page as a unit, and the size of the page is smaller than the size of the block. When writing the data, the offset indicating a memory location of the data block in the memory and the offset indicating a block location of the data in data block serves as the index. When reading the data, reading the data of the page from corresponding block according to the index. In the embodiment, when reading data, there is no need to read all of the data of the block, only the data of one page is needed to be read. It can reduce an amount of unnecessary data to be read, reduce a data throughput when reading the data, and improve an efficiency of reading the data of the memory.

Figure 5:
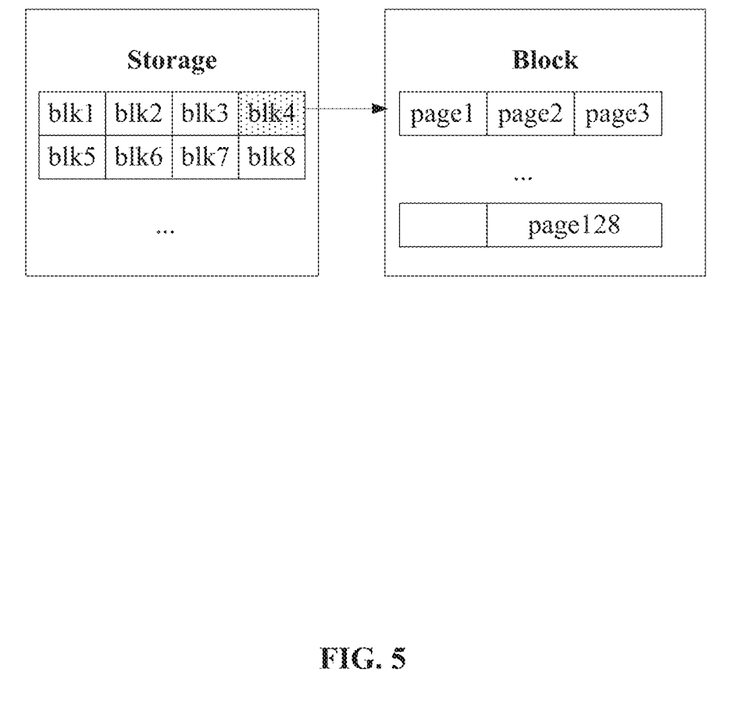
FIG. 5 is a schematic diagram of dividing a storage resource of the memory by taking a block and a page as a unit according to one embodiment of present disclosure.

The size of the block may be different in different embodiments. Referring to FIG. 5, FIG. 5 is a schematic diagram of dividing a storage resource of the memory by taking a block and a page as a unit according to one embodiment of present disclosure. The embodiment shown in FIG. 5 is applied to a solid state disk (SSD). In the embodiment, the size of an erasure unit in the SSD is 512K, and the size of a read unit is 4K. Thus, a block of the SSD is divided by taking 512K as a block, and the size of the SSD divides by 512K equals to the number of the blocks. The size of the page in the block is 4K, and then one block is divided into 128 pages.

It is noted that the storage is not limited to the SSD, other kind of memory is also applied to the present disclosure.

When writing data, a detailed embodiment of combining the data to be written into a data block is described as the follows. Allocating memory blocks in a memory, dividing each memory block by taking a page as a unit, combining the data to be written orderly and writing the data into each page of each memory block in order to combine the data block.

Figure 6:
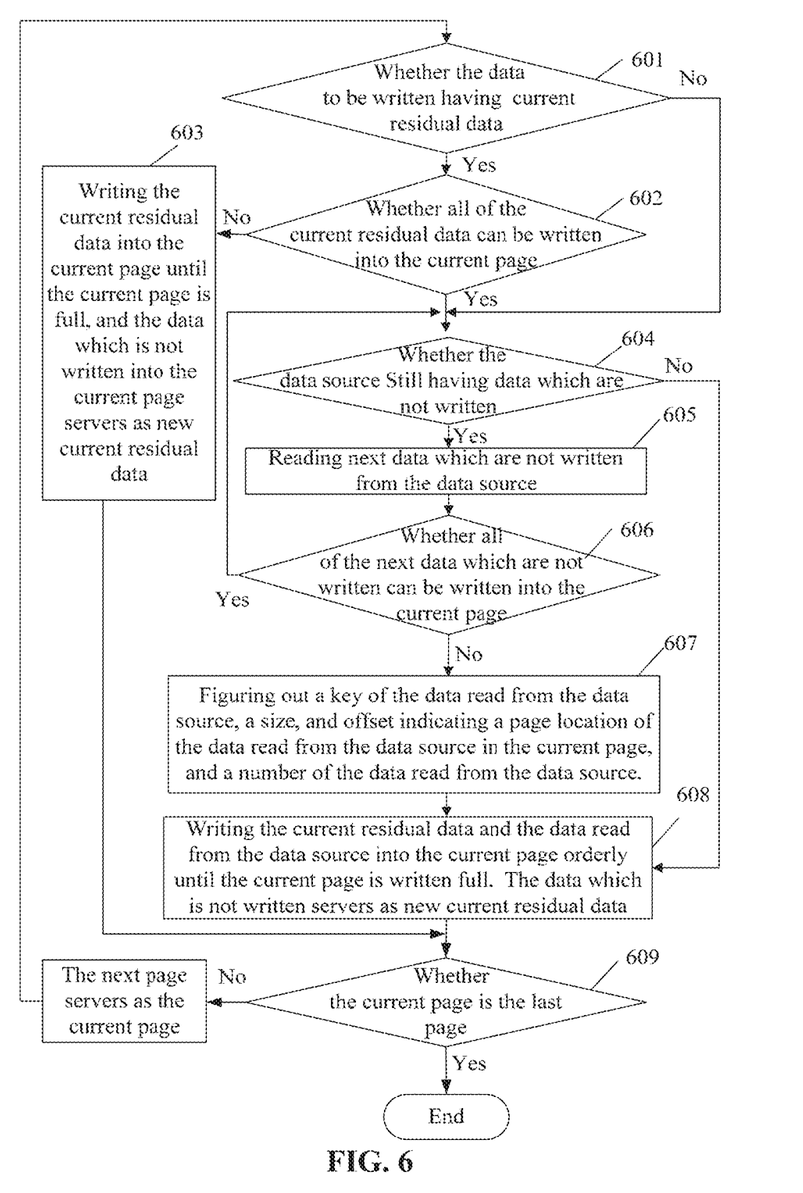
FIG. 6 is a detail flowchart of combining the data to be written orderly and writing the data combined into each page of each memory block according to one embodiment of present disclosure.

Referring to FIG. 6, FIG. 6 is a detail flowchart of combining the data to be written orderly and writing the data into each page of each memory block according to one embodiment of present disclosure. Supposing a size of the block in the memory is 512K, a size of the memory block is also 512K, and a size of the page is 4K. Supposing a data source is needed to be written into the memory, and the size of the data source is less than 512K and each data can be distinguished from each other by the key. The data to be written is combined into one block and the block is written into the memory, and the block is divided into pages. In detail, from the first page of the memory block to the last page of the memory block, a process is implemented as shown in FIG. 6. The process includes the following steps.

Step 601, determining whether the data to be written having current residual data. If the data to be written having the current residual data, a step 602 is implemented; otherwise, a step 604 is implemented. A definition of the current residual data may refer to a step 603 and a step 608.

Step 602, determining whether all of the current residual data can be written into the current page. If all of the current residual data can be written into the current page, the step 604 is implemented; otherwise, the step 603 is implemented.

Step 603, writing the current residual data into the current page until the current page is full, and the data which is not written into the current page serves as new current residual data. Then a step 609 is implemented.

Step 604, determining whether the data source still having data which are not written. If the data source still having the data which are not written, a step 605 is implemented; otherwise, the step 608 is implemented.

Step 605, reading next data which are not written from the data source.

Step 606, determining whether all of the next data which are not written can be written into the current page. If all of the next data can be written into the current page, return back to the step 604; otherwise a step 607 is implemented.

Step 607, figuring out a key of the data read from the data source, a size, and offset indicating a page location of the data read from the data source in the current page, and a number of the data read from the data source. Recording the information figured out in head of the current page. And figuring out the offset indicating a block location of the data page combined with data in the memory block for locating the data when reading the data from the memory. The offset indicating a block location of the data page combined with data is the nth page of the memory block.

Step 608, writing the current residual data and the data read from the data source into the current page orderly until the current page is written full. The data which are not written serve as new current residual data.

Step 609, determining whether the current page is the last page. If the current page is the last page, the procedure is ended; otherwise, a next page serves as the current page, and return back to the step 601.

Mass data are stored in one block by the procedure shown in FIG. 6. The key of the data of each page is stored in each page. The mass data are stored in adjacent pages. The advantage of doing this is that when the mass data are stored in different pages, because the operating system has a pre-read function, a next page can be read together with the current page into a cache. A performance of reading the data is improved.

Figure 7:
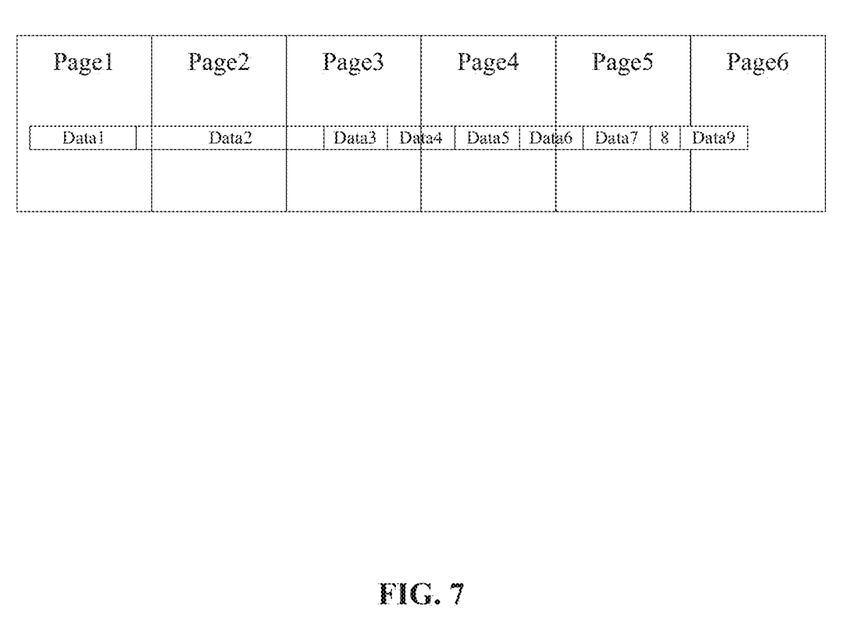
FIG. 7 is a schematic diagram of data distribution of each page of a memory block after a procedure of the FIG. 6.

Referring to FIG. 7, FIG. 7 is a schematic diagram of data distribution of each page of a memory block after a procedure of the FIG. 6. As shown in FIG. 7, a piece of data may be stored in one page, many pieces of data may be stored in a same page, and a piece of data may be stored in many pages. The piece of data is continuously stored in the block and is distributed in continuous pages.

If the size of the data source to be written into the memory is more than 512K, the data left are combined into a block and are written into the memory. Each block is divided into pages; the procedure of each page can refer to FIG. 6.

After the procedure of the above description, the data to be written are combined into the data block in the memory. Then a free segment is searched from the memory, and the data block combined with data is written into the free segment.

In the present disclosure, a use status of each block is identified to identify whether a block is a free block or a used block. When each block in the memory is divided, a use status of each block is set as free in order to indicate the block is a free block (free segment). When the data is written into the free block, a use status of the block is set as used in order to indicate the block is a used block.

In one detailed embodiment of present disclosure, a block of memory is specially used to store the use status of each block. The use status of each block includes the offset indicating a memory location of each block in the memory (such as the block is the nth block) and an identification bit. If a block is a used block, the identification bit of the block is set as "1"; otherwise, if the block is a free block, the identification bit of the block is set as "0". Take a memory which capacity is 1T for example, if the capacity of each block is 512K, the memory is divided into about 2M blocks. The use status information of the 2M blocks need a memory which capacity is only 2M*1 bit=250K.

Before writing the data block combined into the memory, the use status of the block is needed to be searched from the memory. The method of searching the use status can be searching in order, or other searching method. When a free block is searched, the data block is written into the free block. Then the use status of the free block is set to 1 to indicate the free block is changed into a used block.

After the data block combined is written into the free block of the memory, both of the offset indicating a memory location of the free block in the memory and the offset indicating a block location of the data in the block are recorded as the index of the data. The offset indicating a block location of the data in the block is an offset indicating a block location of the data page combined with data in the block (refer to the step 607).

Figure 8:
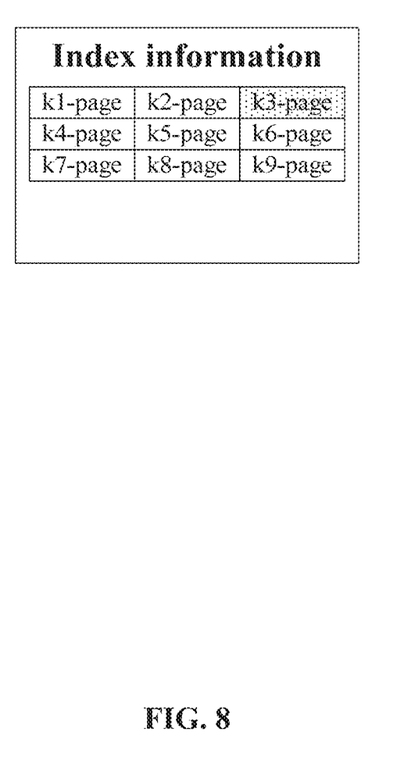
FIG. 8 is a schematic diagram of index according to one embodiment of present disclosure.

The index of each data may be stored in the memory, and the index of each data is configured to indicate the memory location of the data in the memory. In one detailed embodiment, the index of each data is an integer to indicate the page number of the current data. For example, the integer may be an Int. type and 4 bytes. Referring to FIG. 8, FIG. 8 is a schematic diagram of index according to one embodiment of present disclosure. The index of the data is corresponding to the key of the data. The index of the data can be searched according to the key of the data. The index may be an absolute page number of the data page combined with data in the memory. The absolute page number means the page number in the memory is unique. The page from the first page of the first block to the last page of the last block has a unique page number. The index may be a number of the data block combined with data and a relative page number of the data page combined with data in the block. The number of the data block combined with data is an offset, and the relative page number of the data page combined with data is a relative offset indicating a block location of the page in the block.

When reading data, searching the index according to the key of the data, obtaining the offset (such as page number) indicating a memory location of the data page combined with data in the memory according to the index, and then reading the content of the data page from the memory according to the page number of the data page combined with data. As described in the step 607, the key of the data, the size, the offset indicating a page location of the data in the current page, and the amount of the data are recorded in the head of the page. The offset indicating a page location of the data in the current page is found according to the key of the data, the same size of data is read from the offset indicating a page location of the data in the current page according to the size of the data. When all of the data is determined not to be recorded in the current page according to the size of the data, then the data left is automatically read from next page.

The information recorded in the memory, such as the index, the use status of each block of each memory, can be periodically recorded into the memory by the current binlog technology before a data processing system is closed. When the data processing system is restarted, the index and the use status of each block of the memory are reread to the memory for a read and write control use of the memory.

Figure 9:
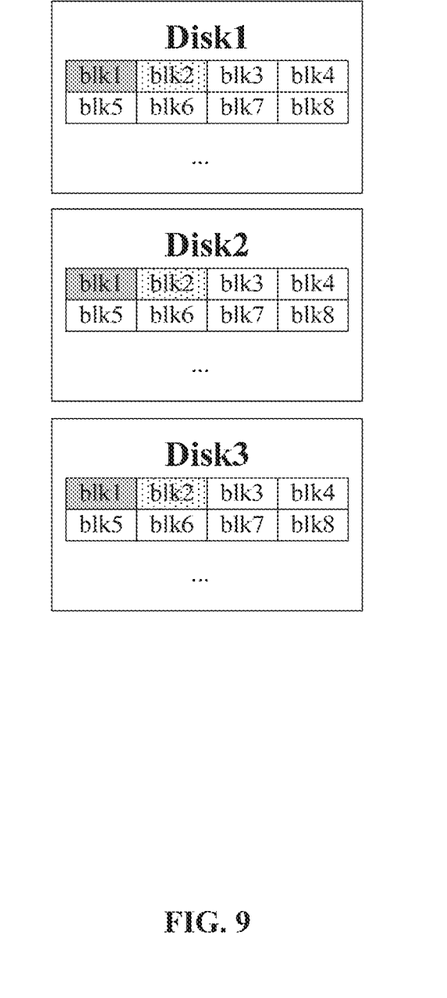
FIG. 9 is a schematic diagram of searching a free segment of the memory and writing the data block combined when the number of the memory is more than one.

The number of the memory of the present disclosure may be more than two, for example, more than one logic disk may be divided from the storage source of the memory. Each logic disk serves as a memory, and the storage source of each logic disk is divided by taking a block and a page as a unit. Referring to FIG. 9, FIG. 9 is a schematic diagram of searching a free segment of the memory and writing the data block combined when the number of the memory is more than one. As shown in FIG. 9, there are many disks, and each disk may serve as a memory, when the number of the memory is more than one, the detailed method of writing the data block combined into the free segment of the memory is described as the follows. Searching from the first block of the first memory to the first block of the last memory, if no free segment is found, searching the next block of each memory orderly until a free segment is found, and then writing the data block combined into the free segment. The order of writing the data block into the free segment of the memory is a sequential order. When writing the data block into the memory next time, searching a new free segment from the location of the free segment fed back last time. If the data is processed by a compact data processing, a new free segment may appear, so when writing the data block into the memory next time, the new free segment is searched from the beginning to the end. Because of the order of writing the data block into the free segment of the memory is a sequential order, a status that one memory is always busy and another one memory is always free may not exist thus the storage source of the memory may distribute balanced.

In typically technology, there is another problem of writing data. In another word, if the power fails when writing the data, the data written into the block may incomplete. Thus, the block where the data is written and the corresponding overflow block may not be visited correctly.

To solve the problem described above, when writing the data, if updating or revising the original data rather than newly adding the data, combining the new data with other data to be written into a data block. Then writing the data block into a new free segment of the memory and updating the index of the data. When reading the data, searching the index updated according to the key of the data, finding the location of the data and reading the latest data from the location.

For example, the data which original identifier is key1 is stored in the Blk1. When updating the data which original identifier is key1, the data is combined in to 512K and then written into the Blk2. It has nothing to do with both of the original data and the original location of the data. Updating the index of the Key1, and indicating the location of the data is B1$k$2. Thus, the problem described in the typically technology described above is solved.

In present disclosure, when updating the data, the new data and other data to be written is combined into a data block, the data block is written into the new free segment of the memory, and the index of the data is updated. The advantage is described as the follows. In typically technology, if the data is hot data which is kept updating, the data is written or read from a same location of the memory that may cause damage to the memory and all the data in the block of the memory can not be used. In present disclosure, the location of the memory is changed every time when the data is updating, the damage caused by the frequently writing and reading in the same location may be avoided. Moreover, if the power fails when updating the data, when the power is on next time, the data is written in the same location and the data written in the block before the power fails is lost in the typically technology. In the present disclosure, when updating the data, the data is written into other location, even if the power fails, the data written before the power fails are not lost and the data written in the block before the power fails can be reused. Thus, the data integrity is ensured when the power fails in the halfway, and the correct visit of the data is also guaranteed.

In present disclosure, when updating the data, the new data are written into a new free segment, thus the original data are invalid essentially. The original data can be deleted, but the original data still occupies the space of the block. Herein, the space occupied by the original data in the original block names free space. The updating method of present disclosure described above may generate new free space and increase the number of the free space. Another method for compacting the data is provided in the present disclosure to reduce or eliminate the free space. The detail method is described as the follows. Setting a valid length for each block of the memory, when updating the data stored in the memory, subtracting a valid length of the data stored in the memory from the valid length of the block where the data is stored in. Obtaining the valid length of each block of the memory at a fixed time, or in real time or artificially. Combining the valid data of the block which valid length is less than a predetermined length (such as the 50% of the total length of the block). Writing the valid data combined into a new free segment and updating the index of the valid data. Setting the block which valid length is less than the predetermined length before combining as the free segment.

For example, if the data K is originally stored in the Blk1, when the data K is updated and newly stored in the B1$k$2, the data K originally stored in the Blk1 is a junk data, and the space corresponding to the data K of the Blk1 is a free space (recycling space) which may be recycled. If the free space is not recycled, the memory may be fulfilled. Thus, the junk data is needed to be clear up periodically to recycle the free space. An information memory block is established in the memory to store the valid length of each block. When the data K is written into the B1$k$2, the original index of the data K is searched to be stored in the Blk1, then the N characters are subtracted from the valid length of the Blk1. The N characters are the length of the data K. After that, scanning the information memory block periodically, when the valid length of the current block is less than a predetermined value (such as, 50% of the total length of the block), then recycling the block. When recycling the block, obtaining the valid data of several blocks which needs to be recycled, combining all the valid data into one data block, writing the data block combined into the memory and updating the indexes of all the valid data of the data block. The blocks recycled are set as free segments, and the free segments can be used next time.

Figure 10:
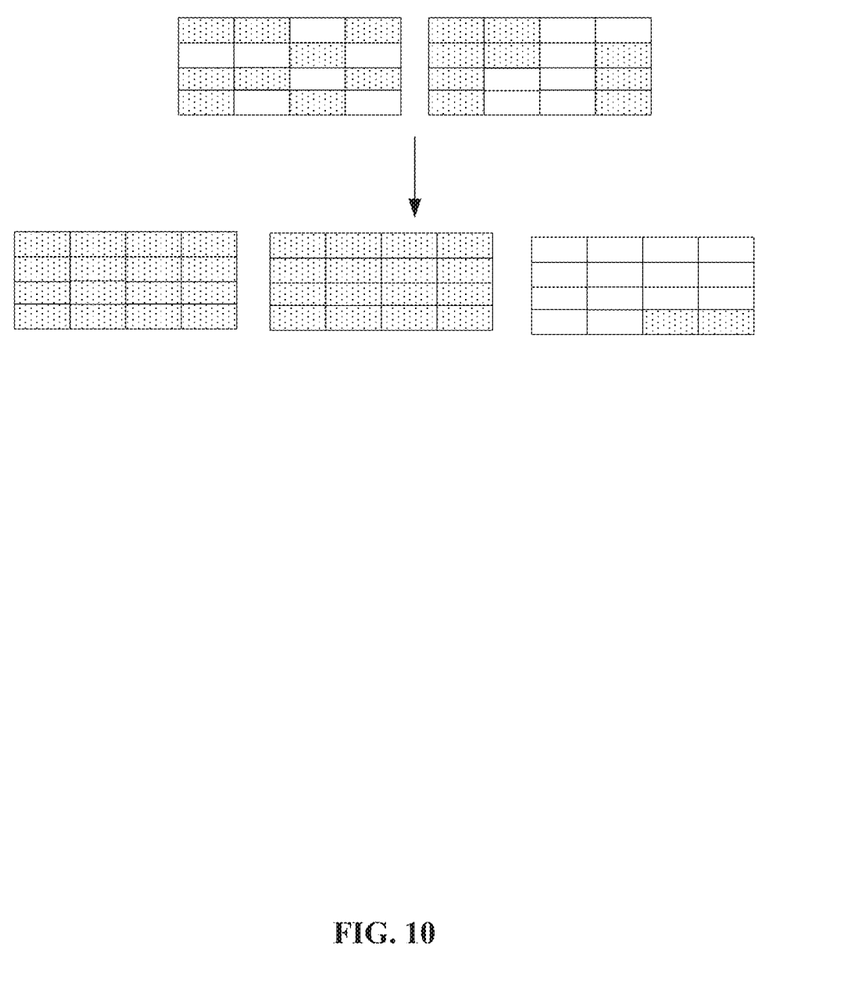
FIG. 10 is a schematic diagram of the free space processed by a data compact processing.

Referring to FIG. 10, FIG. 10 is a schematic diagram of the free space processed by a data compact processing. As shown in FIG. 10, the box filled with gray is a free space. When the free space is more in the two blocks, then the two blocks are combined into one block and are written into a third block. The original two blocks are identified as free segments.

A server is also provided in present disclosure, the server includes at least one memory described above. When the number of the memory is more than two, the method of writing the data combined into the free segment of the memory is described as the follows. Searching from the first block of the first memory to the first block of the last memory, if the free segment is not found, then searching from the next block of the first memory to the next block of the last memory until the free segment is found, then writing the data combined into the free segment.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A read-write control method for at least one memory having a plurality of blocks, comprising:
   to write data, combining data to be written with each other into a data block, writing the data block in a free block of the memory, and recording an identifier and a corresponding index of the data in the memory, the index of the data is an offset indicating a memory location of the data in the memory;
   to read data, reading the data from the offset indicating a memory location of the data in the memory according to an identifier and a index of the data to be read.

2. The read-write control method according to claim 1, wherein the index of the data is an offset indicating a memory location of the data block combined with the data in the memory; when reading the data, reading a whole content of the data block from the offset indicating a memory location of the data block in the memory according to the identifier and the index of the data to be read, and reading the data from the whole content of the data block according to the identifier of the data.

3. The read-write control method according to claim 1, further comprising:

the index of the data is an offset indicating the memory location of the data block combined with the data in the memory, and an offset indicating a block location of the data in the data block combined with the data;

to read the data, figuring out an offset of the data in the memory according to the identifier of the data and the index of the data to be read, and reading the data from the offset indicating a block location of the data in the data block from the memory according to the offset.

4. The read-write control method according to claim 1, further comprising:

dividing each block in the memory by taking a page as a unit, and dividing the data block by taking a page as a unit when combining the data to be written with each other into the data block, the size of the block and the size of the data block being integral multiple of a size of the page;

to write the data, further recording an offset indicating a page location of the data in the page combined with data, the index of the data being an offset indicating a memory location of the data page combined with data in the memory;

to read the data, reading the content of the data page combined with data from the memory according to the identifier and the index of the data to be read, reading the offset indicating a page location of the data in the page, and reading the data from the page according to the offset indicating a page location of the data in the page.

5. The read-write control method according to claim 1, wherein combining the data to be written with each other into a data block comprises:

allocating memory blocks in a memory, dividing each memory block by taking a page as a unit, combining the data to be written and orderly writing the data into the pages of the memory block orderly in order to combine the data into the data block.

6. The read-write control method according to claim 5, wherein combining the data to be written and orderly writing the data into the pages of the memory block orderly comprises:

determining whether the data to be written into a current page have current residual data;

determining whether all of the current residual data can be written into the current page if the data to be written into the current page have current residual data;

writing the current residual data into the current page until the current page is full if not all of the current residual data can be written into the current page, and the data which are not written into the current page serving as new current residual data;

determining whether a data source still has data which are not written, if the data to be written into the current page do not have current residual data or all of the current residual data can be written into the current page;

reading next data which are not written from the data source if the data source still has data which are not written;

determining whether all of the next data which are not written can be written into the current page;

determining whether the data source still has data which are not written, if all of the next data which are not written can be written into the current page;

figuring out a key of the data read from the data source, an offset indicating a page location of the data read from the data source in the current page, a size and a number of the data read from the data source, recording the information figured out in head of the current page, and figuring out an offset indicating a block location of the data page combined with data in the memory block if not all of the next data which are not written can be written into the current page;

orderly writing the current residual data and the data read from the data source into the current page until the current page is written full if not all of the next data which are not written can be written into the current page, the data which are not written serving as the new current residual data; and determining whether the current page is the last page.

7. The read-write control method according to claim 1, wherein the blocks of the memory have the same size, and the data block has the same size as that of the blocks of the memory.

8. The read-write control method according to claim 7, wherein the block has a size of 512K, and the page has a size of 4K.

9. The read-write control method according to claim 1, wherein when the number of the memories is two or more, the step of writing the data block in a free block of the memory comprises:

orderly searching from the first block of the first memory to the first block of the last memory, if no free blocks are found, searching next block of each memory until a free block is found, writing the data block into the free block.

10. The read-write control method according to claim 1, wherein when updating data stored in the memory, combining new data with other data to be written into a data block, writing the data block in a new free block of the memory and updating the index of the data.

11. The read-write control method according to claim 10, further comprising:

setting a valid length for each block of the memory;

when updating the data stored in the memory, subtracting a length of the data stored in the memory from the valid length of the block where the data is stored;

obtaining the valid length of each block of the memory, combining valid data of the blocks of which the valid lengths are less than a predetermined length, writing the combined valid data into a new free block and updating the index of the valid data, and setting the blocks of which the valid lengths are less than the predetermined length before combining as the free block.

12. A memory having a plurality of blocks, wherein the memory comprises:

a write control module, configured to combine data to be written with each other into a data block, write the data block in a free block of the memory, and record an identifier and a corresponding index of the data in the memory, the index of the data being an offset indicating a memory location of the data in the memory; and a read control module, configured to read the data from the offset indicating a memory location of the data in the memory according to an identifier and an index of the data to be read.

13. The memory according to claim 12, wherein each block in the memory is divided by taking a page as a unit;

the write control module is further configured to divide the data block by taking a page as a unit when combining the data to be written with each other into the data block, and record an offset indicating a page location of the data in the page combined with the data, the index of the data being an offset indicating a memory location of the data page combined with data in the memory;

when reading the data, the read control module is further configured to read the content of the data page combined with data from the memory according to the identifier and the index of the data to be read, read the offset indicating a page location of the data in the page, and read the data from the page according to the offset indicating a page location of the data in the page;

a size of the block and a size of the data block are integral multiple of a size of the page.

14. A server, comprising at least one memory having a plurality of blocks;
one or more processors to execute a read-write control method for the memory, the method comprising:
to write data, combining data to be written with each other into a data block, writing the data block in a free block of the memory, and recording an identifier and a corresponding index of the data in the memory, the index of the data is an offset indicating a memory location of the data in the memory;
to read data, reading the data from the offset indicating a memory location of the data in the memory according to an identifier and an index of the data to be read.

15. The server according to claim 14, wherein when the number of the memories is two or more, writing the data block in a free block of the memory comprises:
orderly searching from the first block of the first memory to the first block of the last memory, if no free blocks are found, searching next block of each memory until a free block is found, writing the data block into the free block.

16. The server according to claim 14, further comprising:
dividing each block in the memory by taking a page as a unit, and dividing the data block by taking a page as a unit when combining the data to be written with each other into the data block, the size of the block and the size of the data block being integral multiple of a size of the page;
to write the data, further recording an offset indicating a page location of the data in the page combined with data, the index of the data being an offset indicating a memory location of the data page combined with data in the memory;
to read the data, reading the content of the data page combined with data from the memory according to the identifier and the index of the data to be read, reading the offset indicating a page location of the data in the page, and reading the data from the page according to the offset indicating a page location of the data in the page.

* * * * *

UNITED STATES PATENT AND TRADEMARK OFFICE
CERTIFICATE OF CORRECTION

PATENT NO.        : 9,990,276 B2
APPLICATION NO.   : 14/463071
DATED             : June 5, 2018
INVENTOR(S)       : Jianfeng Xu Page 1 of 1

It is certified that error appears in the above-identified patent and that said Letters Patent is hereby corrected as shown below:

In the Claims

Claim 1, Column 10, Line 58, before the word "index", please change "a" to --an--.

Signed and Sealed this
Tenth Day of July, 2018

Andrei Iancu
*Director of the United States Patent and Trademark Office*